(12) United States Patent
Fowler

(10) Patent No.: US 7,077,604 B1
(45) Date of Patent: Jul. 18, 2006

(54) ARTICLE CARRIER APPARATUS AND SYSTEM COMPRISING SAME

(76) Inventor: Morgan Fowler, 2964 Lyles Rd., Senatobia, MS (US) 38668

( * ) Notice: Subject to any disclaimer, the term of this patent is extended or adjusted under 35 U.S.C. 154(b) by 0 days.

(21) Appl. No.: 11/176,486

(22) Filed: Jul. 7, 2005

(51) Int. Cl.
*B65G 51/06* (2006.01)

(52) U.S. Cl. ........................ 406/188; 406/187

(58) Field of Classification Search ............... 406/184, 406/185, 186, 187, 188, 189, 190
See application file for complete search history.

(56) References Cited

U.S. PATENT DOCUMENTS

| | | | |
|---|---|---|---|
| 3,701,497 A * | 10/1972 | Anders et al. ............... | 406/188 |
| 4,264,032 A | 4/1981 | Vanis | |
| 4,941,777 A | 7/1990 | Kieronski | |
| 5,174,689 A | 12/1992 | Kondolf, Jr. | |
| 5,215,412 A * | 6/1993 | Rogoff et al. ............... | 406/112 |
| 5,356,243 A | 10/1994 | Vogel | |
| 5,518,545 A | 5/1996 | Miyano | |
| 6,474,912 B1 | 11/2002 | Meeks | |
| 6,729,808 B1 | 5/2004 | Nelson | |

* cited by examiner

*Primary Examiner*—Joe Dillon, Jr.
(74) *Attorney, Agent, or Firm*—Galasso & Associates, LP; Raymond M. Galasso; David O. Simmons

(57) ABSTRACT

An article carrier apparatus configured for use with a pneumatic article transport system comprises a tubular body, a first end cap attached to a first end of the tubular body, a second end cap attached to a second end of the tubular body and a first door pivotally attached to at least one of the first end cap and the tubular body. The first door is movable between an open position and a closed position with respect to an access opening in the first end cap. An interior space of the tubular body is accessible through the access opening of the first end cap when the first door is in the open position. The first door is at least partially disposed within the interior space of the tubular body when the first door is in the open position.

19 Claims, 3 Drawing Sheets

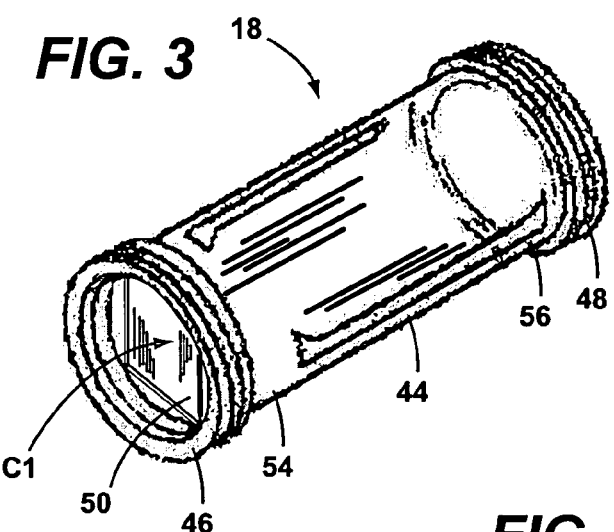
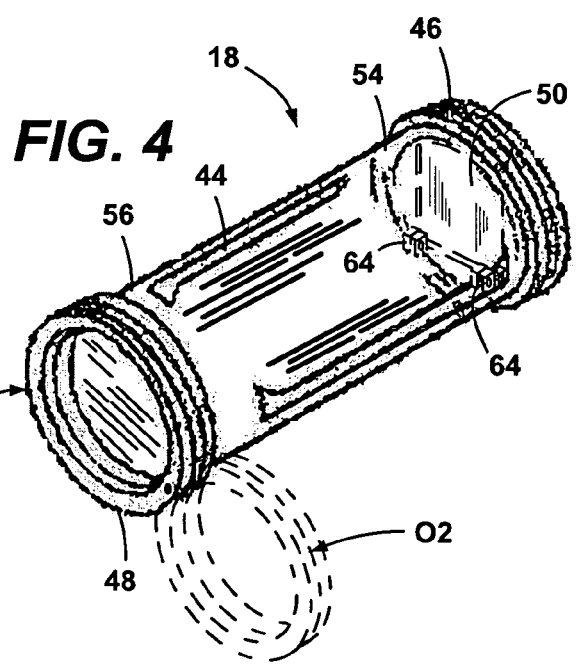
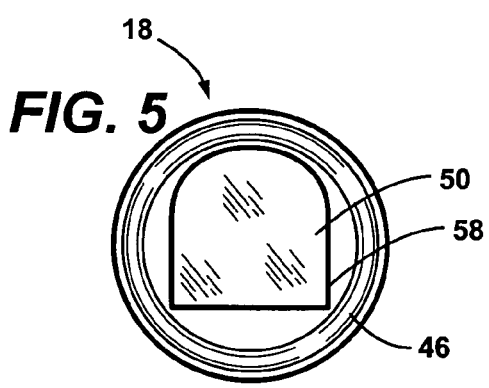

ARTICLE CARRIER APPARATUS AND SYSTEM COMPRISING SAME

FIELD OF THE DISCLOSURE

The disclosures made herein relate generally to article transport systems and, more particularly, to article transport systems using an energising means such as pneumatic power.

BACKGROUND

Suburban and rural homeowners typically have a mailbox located at a road at the edge of their property or across the street from their property. A post mounted or pedestal mounted mailbox is an example of a conventional mailbox used in such an arrangement. Mail is deposited in the mailbox by a mail carrier and is retrieved by the mail recipient (i.e., an individual, a member of a household, a member of a business, etc).

A conventional, remotely-located residential mailbox (i.e., a conventional mailbox located at a road at the edge of their property or across the street from their property) is convenient and financially advantageous for the postal service because it allows mail to be delivered without the mail carrier having to leave their vehicle and/or individually delivery mail at each physical building on a mail route. However, this arrangement is less than convenient for the mail recipient as it requires them to venture outdoors in sometimes inclement whether conditions, which may result in falling on a slippery surface or becoming ill. The mail recipient also places himself or herself in danger in that they generally must stand near a roadway to retrieve their mail.

Mail tampering is another drawback associated with conventional mailboxes located remotely from a recipients premise. A conventional, remotely-located residential mailbox (i.e., a conventional mailbox located at a road at the edge of their property or across the street from their property) is typically not locked, even though it is lockable. Thus, the potential exists for the recipients mail to be tampered with or for undesirable and/or dangerous object to be readily placed in their mailbox.

Various types of article transport systems that are configured for and/or capable of transporting mail from a remote location (e.g., at an edge of the recipient's property) to a recipient premise (e.g., the recipient's home) are known. Examples of such known mail transport systems (i.e., conventional article transport systems) are disclosed in U.S. Pat. Nos. 4,264,032; 6,474,912; 5,518,545; 5,356,243; 5,215,412; 5,174,689; 4,941,777 and 6,729,808. While each these conventional article transport systems do provide a means for transporting mail from a remote location to a recipient premise, they are also not without one or more limitations. One limitation is that some such conventional article transport systems include a carrier device that can be readily removed at the location where a carrier deposits mail, which can result in theft of the carrier device, insertion of foreign objects into a carrier tube of the system, etc. Another limitation is that some such conventional article transport systems include a carrier device that does not include means for precluding extraction of mail by an unauthorized party once the mail has been deposited within the carrier device.

Therefore, an approach for delivering mail through transportation from a remote location in a manner that overcomes limitations associated with conventional article transport systems would be useful and advantageous.

SUMMARY OF THE DISCLOSURE

In one embodiment of the present invention, an article carrier apparatus configured for use with a pneumatic article transport system comprises a tubular body, a first end cap attached to a first end of the tubular body, a second end cap attached to a second end of the tubular body and a first door pivotally attached to at least one of the first end cap and the tubular body. The first door is movable between an open position and a closed position with respect to an access opening in the first end cap. An interior space of the tubular body is accessible through the access opening of the first end cap when the first door is in the open position. The first door is at least partially disposed within the interior space of the tubular body when the first door is in the open position.

In another embodiment of the present invention, an article transport system kit comprises an elongated carrier tube, a first end housing connectable to a first end of the elongated carrier tube, a second end housing connectable to a second end of the elongated carrier tube and an article carrier apparatus positionable within a carrier passage jointly defined within the end housings and the elongated carrier tube. The article carrier apparatus includes a tubular body, a first end cap attached to a first end of the tubular body, a second end cap attached to a second end of the tubular body and a first door pivotally attached to at least one of the first end cap and the tubular body. The first door is movable between an open position and a closed position with respect to an access opening in the first end cap. An interior space of the tubular body is accessible through the access opening of the first end cap when the first door is in the open position. The first door is at least partially disposed within the interior space of the tubular body when the first door is in the open position.

In another embodiment of the present invention, an article transport system comprises an elongated carrier tube, an article receiving assembly, a system control assembly and an article carrier apparatus. The mailbox assembly includes a first end housing connected to a first end of the elongated carrier tube and a support body connected to the first end housing. The system control assembly includes a second end housing connected to a second end of the elongated carrier tube and a transport energizing unit attached to the second end housing. The article carrier apparatus is movably disposed within a carrier passage jointly defined within the end housings and the elongated carrier tube. The article carrier apparatus includes a tubular body, a first end cap attached to a first end of the tubular body, a second end cap attached to a second end of the tubular body and a first door pivotally attached to at least one of the first end cap and the tubular body. The first door is movable between an open position and a closed position with respect to an access opening in the first end cap. An interior space of the tubular body is accessible through the access opening of the first end cap when the first door is in the open position. The first door is at least partially disposed within the interior space of the tubular body when the first door is in the open position.

Turning now to specific aspects of the present invention, in at least one embodiment, the tubular body has a generally round cross-sectional profile.

In at least one embodiment of the present invention, the first door has generally straight side edges.

In at least one embodiment of the present invention, the first door is biased to the closed position.

In at least one embodiment of the present invention, a resilient member is engaged between the first door and at least one of the first end cap and the tubular body, wherein the resilient member biases the first door to the closed position.

In at least one embodiment of the present invention, a second door is pivotally attached to at least one of the second end cap and the tubular body, the second door is movable between an open position and a closed position with respect to an access opening in the second end cap, the interior space of the tubular body is accessible through the access opening of the second end cap when the second door is in the open position, and the second door is disposed entirely outside of the interior space of the tubular body when the second door is in the open position.

In at least one embodiment of the present invention, a first end of the first end housing is attached to a first end of the elongated carrier tube, the carrier passage extends into first end housing, and the first end housing includes means for preventing the article carrier apparatus from being removed from the first end housing through an access opening in a second end of the first end housing.

In at least one embodiment of the present invention, a first end of the first end housing is attached to a first end of the elongated carrier tube, the carrier passage extends into first end housing, the first end housing includes an access opening in a second end of the first end housing, and the access opening in the second end of the first end housing is positioned and sized for enabling access to the interior space of the article carrier apparatus therethrough.

These and other objects, embodiments advantages and/or distinctions of the present invention will become readily apparent upon further review of the following specification, associated drawings and appended claims.

BRIEF DESCRIPTION OF THE DRAWINGS

FIG. 3 is a perspective view from a first end of an article carrier apparatus in accordance with the present invention.

FIG. 4 is a perspective view from a second end of the article carrier apparatus in FIG. 3.

FIG. 5 is an end view of the first end of the article carrier apparatus in FIG. 3.

DETAILED DESCRIPTION OF THE DRAWING FIGURES

Figure 1:
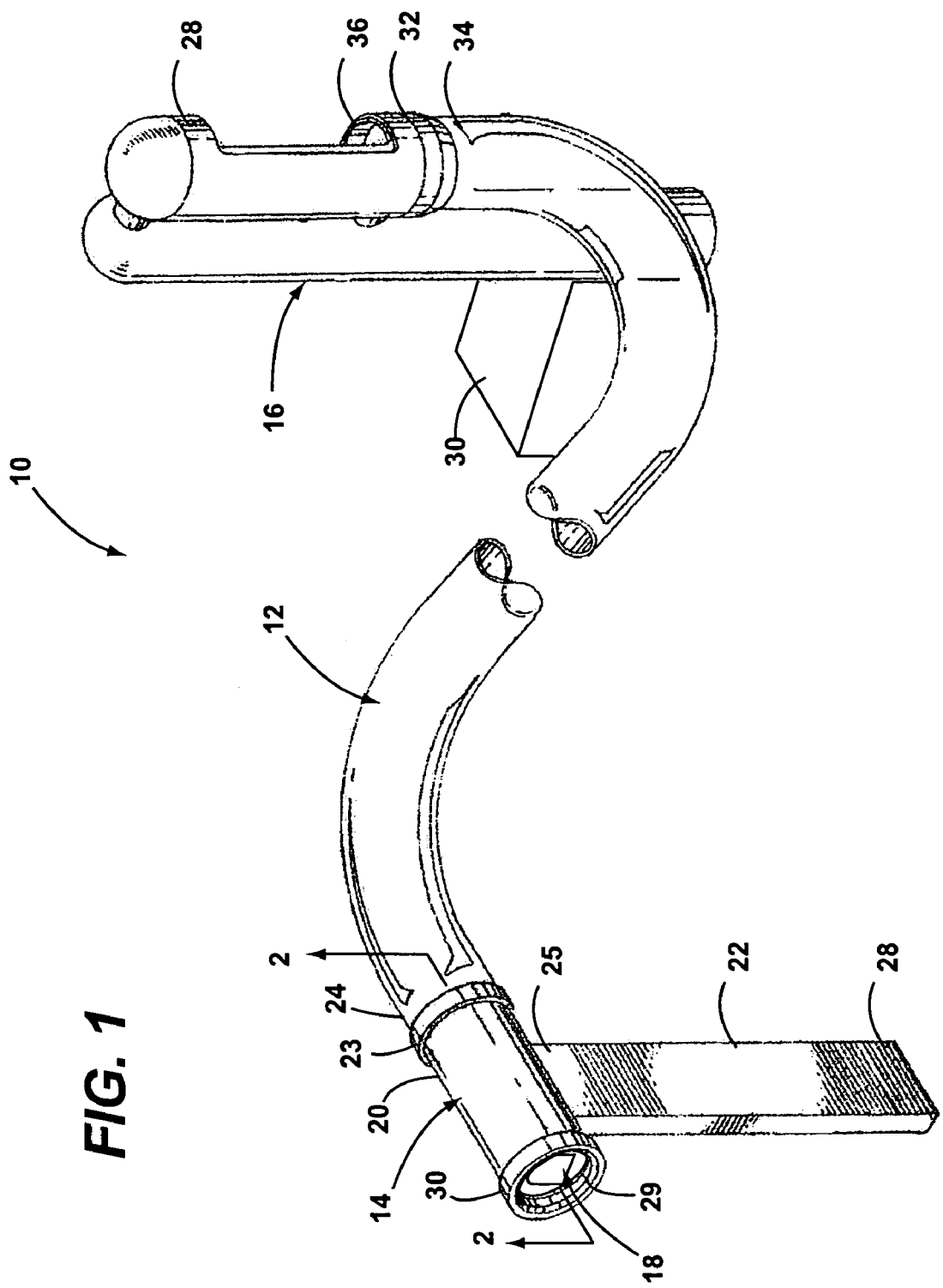
FIG. 1 depicts an embodiment of a mail transport system in accordance with the present invention.

FIG. 1 depicts an embodiment of a mail transport system in accordance with the present invention, referred to herein as the mail transport system 10. The mail transport system 10 includes an elongated carrier tube 12, a mailbox assembly 14 (i.e., an article receiving assembly), a system control assembly 16 and an article carrier apparatus 18. In practice, the system control assembly 16 is located at a first location (e.g., a location in a home, a mail delivery station at an office building, etc) and the mailbox assembly 14 is located at a remote location from the system control assembly 16 (e.g., at a curb in front of the home, a mailroom in an office building, etc). The elongated carrier tube 12 is connected between the mailbox assembly 14 and the system control assembly 16. The elongated carrier tube 12 may be mounted above ground, underground, in building walls, etc. The elongated carrier tube 12 may be a single length of tubular material or a plurality of interconnected segments of tubular material. As is discussed in greater detail below, the elongated carrier tube 12, the mailbox assembly 14, the system control assembly 16 and the article carrier apparatus 18 are interconnected and interoperable for enabling mail to be transported within the article carrier apparatus 18 through the elongated carrier tube 12 from the mailbox assembly 14 to the system control assembly 16.

Figure 2:
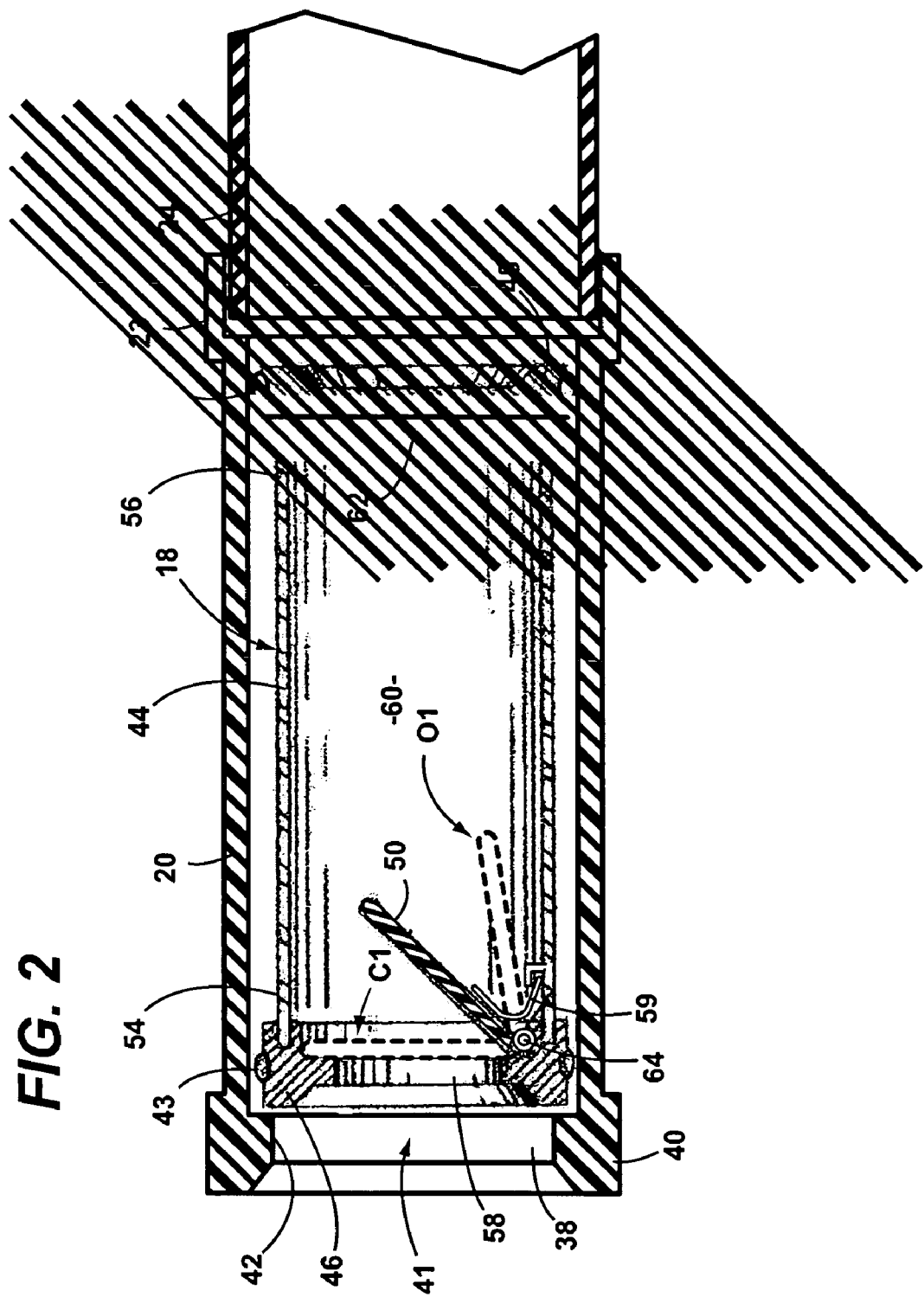
FIG. 2 is a fragmented cross-sectional view taken along the line 2—2 in FIG. 1.

Referring to FIGS. 1 and 2, the mailbox assembly 14 includes a first end housing 20 and a support body 22. The first end housing 20 is connected at a first end 23 thereof to a first end 24 of the elongated carrier tube 12. The support body 22 is connected at a first end 25 to the first end housing 20 and is provided for enabling the first end housing 20 to be installed at a desired location. For example, a bottom end 26 of the support body 22 may be secured within a hole in the ground. It is disclosed herein that, in alternate embodiments of the present invention, the support body 22 is omitted and the support body 22 is mounted via alternate means (e.g., mounted within a stone or stucco mail box pedestal).

The system control assembly 16 (FIG. 1) includes a second end housing 28 and a transport energizing unit 30. The second end housing 28 is connected at a first end 32 thereof to a second end 34 of the elongated carrier tube 12. The second end housing 28 includes an access opening 36 therein through which the article carrier apparatus 18 may be removed from and reinstalled within the second end housing 28. The access opening 36 in the second end of the first end housing is positioned and sized for enabling access to the interior space 62 of the article carrier apparatus 18 therethrough.

As depicted in FIGS. 1 and 2, the article carrier apparatus 18 is slidably disposed within a carrier passage jointly defined within the end housings (20, 28) and the elongated carrier tube 12. The first end housing 20 has an access opening 38 at a second end 40 thereof. The article carrier apparatus 18 is accessible through the access opening 38 of the first end housing 20 when the article carrier apparatus 18 is positioned within the carrier passage adjacent the access opening 38. The first end housing 20 includes an access opening 41 that is positioned and sized for enabling access to the article carrier apparatus 18 therethrough.

First end housing 20 includes a stepped portion 42 that serves as a means for preventing removal of the article carrier apparatus 18 through the access opening 38 of the first end housing 20. In applications where the first end housing 20 will be publicly accessible, it is preferred that the article carrier apparatus 18 is not removable from the first end housing 20. By preventing removal of the article carrier apparatus 18 from the first end housing 20 the potential of theft of the article carrier apparatus 18 and vandalism to the article carrier apparatus 18 is reduced. It is disclosed herein that other means for preventing removal of the article carrier apparatus 18 may be implemented (e.g., one or more protruding members, a discrete ring mounted within the access opening 38, etc).

The transport energizing unit 30 of the system control assembly 16 is connected to the second end housing 28 and is configured for generating positive pressure and/or negative pressure within the carrier passage jointly defined within the end housings (20, 28) and the elongated carrier tube 12. Through such pressure, the article carrier apparatus 18 may be transported through the elongated carrier tube 12 between the end housings (20, 28). For example, the transport energizing unit 30 may be connected to the second end housing 28 in a manner whereby an applied positive pressure causes the article carrier apparatus 18 to be transported from the second end housing 28 to the first end housing 20 and an applied negative pressure causes the article carrier apparatus 18 to be transported from the first end housing 20 to the second end housing 28. Depending on the specific construction of the second end housing and operation of the transport energizing unit 30, the necessity and/or preference may exist for a sealing cover (not specifically shown) to be mounted over the access opening 36 of the second end housing 28 for enabling required pressure generation within the carrier passage.

Preferably, the transport energizing unit 30 is a pneumatic energizing unit, which uses air pressure to facilitate transport of the article carrier apparatus 18. However, it is disclosed herein that alternate types of energizing units may be implemented. For example, a transport energizing unit that utilizes a belt drive arrangement (i.e., a belt connected between a motor and the article carrier apparatus 18) may facilitate transport of the article carrier apparatus 18.

Referring now to FIGS. 2–5, the article carrier apparatus 18 includes a tubular body 44, a first end cap 46, a second end cap 48, a first door 50 and a second door 52. The first end cap 46 is attached to a first end 54 of the tubular body 44. The second end cap 48 is attached to a second end 56 of the tubular body 44. The first end cap 46 includes a respective sealing member 43 and the second end cap 48 includes a respective sealing member 45. The sealing members (43, 43) of the end caps (46, 48) provide a seal between the article carrier apparatus 18 and the carrier passage.

The first door 50 is pivotally attached to the first end cap 46. Optionally, the first door may be attached to the tubular body 44 or to both the first end cap 46 and to the tubular body 44. The first door 50 is movable between an open position O1 and a closed position C1 with respect to an access opening 58 in the first end cap 46. The first door 50 is biased to the closed position C1 by a resilient member (i.e., a means) such as a spring 59 (FIG. 2). When in the closed position C1, the first door engages a rear surface 63 of the first end body 46. In this manner, the first door 50 serves as a one-way door through which mail may readily inserted, but not readily removed. An interior space 60 of the tubular body 44 is accessible through the access opening 58 of the first end cap 46 when the first door 50 is in the open position O1. The first door 50 is at least partially disposed within the interior space 60 of the tubular body 44 when the first door 50 is in the open position O1.

The second door 52 is pivotally attached to the second end cap 48. Optionally, the second door 52 may be attached to the tubular body 44 or to both the first end cap 46 and to the tubular body 44. The second door 52 is movable between an open position O2 and a closed position C2 with respect to an access opening 62 in the second end cap 48. The interior space 60 of the tubular body 44 is accessible through the access opening 62 of the second end cap 48 when the second door 52 is in the open position O2. The second door 52 is disposed entirely outside of the interior space 60 of the tubular body 44 when the second door 52 is in the open position O2.

The tubular body 44 preferably, but not necessarily, has a generally round exterior cross-sectional profile and a generally round interior cross-sectional profile. Thus, the first door 50 requires a shape that enables the permits movement of the first door 50 to placement within the interior space 60 of the tubular body 44. In one embodiment, the first door 50 has generally straight side edges and a generally straight bottom edge (FIG. 5). The top edge preferably, but not necessarily, follows the general interior profile of the tubular body 44. Optionally, the tubular body 44 may have a cross sectional shape that is at least partially rectangular and the first door 50 may have a rectangular shape. The first door 50 is pivotally attached by means such as, for example, hinges 64 that are connected between the first door 50 and first end cap 46. Optionally, the hinges 64 may be connected between the first door 50 and tubular body 44.

Although not specifically shown, it is disclosed herein that the act of depositing articles in the article carrier apparatus 18 may automatically cause the article carrier apparatus 18 to be transported from the first end housing 20 to the second end housing 22. For example, an activation means such as an optical or mechanical switch may be attached to the first door 50 of the article carrier apparatus 18 and be triggered by opening and closing of the first door 50. In response to such triggering, a signal is sent from the first end housing 20 and/or article carrier apparatus 18 to the transport energizing unit 30 for facilitating transport of the article carrier apparatus 18 from the first end housing 20 to the second end housing 22.

It is disclosed herein that an article transport system in accordance with the present invention may be provided in the form of a kit (i.e., an article transport system kit). The kit includes all of the elements of the mail transport system 10 depicted in FIG. 1. The elements are interconnectable and interoperable as discussed above in reference to FIGS. 1–5. Such a kit is useful in that it enables an entity such as a homeowner to install an article transport system in accordance with the present invention.

While a preferred embodiment of the present invention is a mail transport system, the present invention is not limited to the transport (e.g., delivery) of mail. Various other articles may be transported with an article carrier apparatus or system in accordance with the present invention. Similarly, an article carrier apparatus or system in accordance with the present invention may be used in an environment other than that associated with mail transport and/or delivery. Accordingly, it is disclosed herein that the present invention may be embodied by an article transport system used for transporting a variety of different types of articles in a variety of different types of environments.

In the preceding detailed description, reference has been made to the accompanying drawings that form a part hereof, and in which are shown by way of illustration specific embodiments in which the present invention may be practiced. These embodiments, and certain variants thereof, have been described in sufficient detail to enable those skilled in the art to practice embodiments of the present invention. It is to be understood that other suitable embodiments may be utilized and that logical, mechanical, chemical and electrical changes may be made without departing from the spirit or scope of such inventive disclosures. To avoid unnecessary detail, the description omits certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An article carrier apparatus configured for use with a pneumatic article transport system, comprising:
   a tubular body;
   a first end cap attached to a first end of the tubular body;
   a second end cap attached to a second end of the tubular body; and
   a first door pivotally attached to at least one of the first end cap and the tubular body, wherein the first door is movable between an open position and a closed position with respect to an access opening in the first end cap, wherein an interior space of the tubular body is accessible through the access opening of the first end cap when the first door is in the open position and wherein the first door is at least partially disposed within the interior space of the tubular body when the first door is in the open position.

2. The article carrier apparatus of claim 1 wherein the tubular body has a generally round cross-sectional profile.

3. The article carrier apparatus of claim 2 wherein the first door has generally straight side edges.

4. The article carrier apparatus of claim 1 wherein the first door is biased to the closed position.

5. The article carrier apparatus of claim 4, further comprising:
a resilient member engaged between the first door and at least one of the first end cap and the tubular body, wherein the resilient member biases the first door to the closed position.

6. The article carrier apparatus of claim 1, further comprising:
a second door pivotally attached to at least one of the second end cap and the tubular body, wherein the second door is movable between an open position and a closed position with respect to an access opening in the second end cap, wherein the interior space of the tubular body is accessible through the access opening of the second end cap when the second door is in the open position and wherein the second door is disposed entirely outside of the interior space of the tubular body when the second door is in the open position.

7. The article carrier apparatus of claim 1, further comprising:
a resilient member engaged between the first door and at least one of the first end cap and the tubular body for biasing the first door to the closed position; and
a second door pivotally attached to at least one of the second end cap and the tubular body, wherein the second door is movable between an open position and a closed position with respect to an access opening in the second end cap, wherein the interior space of the tubular body is accessible through the access opening of the second end cap when the second door is in the open position and wherein the second door is disposed entirely outside of the interior space of the tubular body when the second door is in the open position;
wherein the tubular body has a generally round cross-sectional profile;
wherein the first door has generally straight side edges;
wherein the first door is biased to the closed position.

8. An article transport system kit, comprising:
an elongated carrier tube;
a first end housing connectable to a first end of the elongated carrier tube;
a second end housing connectable to a second end of the elongated carrier tube; and
an article carrier apparatus positionable within a carrier passage jointly defined within said end housings and the elongated carrier tube, wherein the article carrier apparatus includes a tubular body, a first end cap attached to a first end of the tubular body, a second end cap attached to a second end of the tubular body and a first door pivotally attached to at least one of the first end cap and the tubular body, wherein the first door is movable between an open position and a closed position with respect to an access opening in the first end cap, wherein an interior space of the tubular body is accessible through the access opening of the first end cap when the first door is in the open position and wherein the first door is at least partially disposed within the interior space of the tubular body when the first door is in the open position.

9. The article transport system kit of claim 8 wherein:
a first end of the first end housing is attached to a first end of the elongated carrier tube;
the carrier passage extends into first end housing; and
the first end housing includes means for preventing the article carrier apparatus from being removed from the first end housing through an access opening in a second end of the first end housing.

10. The article transport system kit of claim 8 wherein:
a first end of the first end housing is attached to a first end of the elongated carrier tube;
the carrier passage extends into first end housing;
the first end housing includes an access opening in a second end of the first end housing; and
the access opening in the second end of the first end housing is positioned and sized for enabling access to the interior space of the article carrier apparatus therethrough.

11. The article transport system kit of claim 10 wherein the first end housing includes means for preventing the article carrier apparatus from being removed from the first end housing through the access opening in the second end of the first end housing.

12. The article transport system kit of claim 8 wherein the first door is biased to the closed position.

13. The article transport system kit of claim 12, further comprising:
a resilient member engaged between the first door and at least one of the first end cap and the tubular body, wherein the resilient member biases the first door to the closed position.

14. The article transport system kit of claim 8, further comprising:
a second door pivotally attached to at least one of the second end cap and the tubular body, wherein the second door is movable between an open position and a closed position with respect to an access opening in the second end cap, wherein the interior space of the tubular body is accessible through the access opening of the second end cap when the second door is in the open position and wherein the second door is disposed entirely outside of the interior space of the tubular body when the second door is in the open position.

15. The article transport system kit of claim 8, further comprising:
a resilient member engaged between the first door and at least one of the first end cap and the tubular body, wherein the resilient member biases the first door to the closed position; and
a second door pivotally attached to at least one of the second end cap and the tubular body;
wherein the second door is movable between an open position and a closed position with respect to an access opening in the second end cap;
wherein the interior space of the tubular body is accessible through the access opening of the second end cap when the second door is in the open position;
wherein the second door is disposed entirely outside of the interior space of the tubular body when the second door is in the open position;
wherein a first end of the first end housing is attached to a first end of the elongated carrier tube;

wherein the carrier passage extends into first end housing; and wherein the first end housing includes means for preventing the article carrier apparatus from being removed from the first end housing through an access opening in a second end of the first end housing.

16. An article transport system, comprising:

an elongated carrier tube;

an article receiving assembly including a first end housing connected to a first end of the elongated carrier tube and a support body connected to the first end housing;

a system control assembly including a second end housing connected to a second end of the elongated carrier tube and a transport energizing unit attached to the second end housing; and an article carrier apparatus movably disposed within a carrier passage jointly defined within said end housings and the elongated carrier tube, wherein the article carrier apparatus includes a tubular body, a first end cap attached to a first end of the tubular body, a second end cap attached to a second end of the tubular body and a first door pivotally attached to at least one of the first end cap and the tubular body, wherein the first door is movable between an open position and a closed position with respect to an access opening in the first end cap, wherein an interior space of the tubular body is accessible through the access opening of the first end cap when the first door is in the open position and wherein the first door is at least partially disposed within the interior space of the tubular body when the first door is in the open position.

17. The article transport system of claim 16 wherein:

the article carrier apparatus includes a second door pivotally attached to at least one of the second end cap and the tubular body;

the second door is movable between an open position and a closed position with respect to an access opening in the second end cap;

the interior space of the tubular body is accessible through the access opening of the second end cap when the second door is in the open position; and the second door is disposed entirely outside of the interior space of the tubular body when the second door is in the open position.

18. The article transport system of claim 17 wherein:

a first end of the first end housing is attached to a first end of the elongated carrier tube;

the carrier passage extends into first end housing; and the first end housing includes means for preventing the article carrier apparatus from being removed from the first end housing through an access opening in a second end of the first end housing.

19. The article transport system of claim 18 wherein:

a first end of the first end housing is attached to a first end of the elongated carrier tube;

the carrier passage extends into first end housing;

the first end housing includes an access opening in a second end of the first end housing; and the access opening in the second end of the first end housing is positioned and sized for enabling access to the interior space of the article carrier apparatus therethrough.

* * * * *